Patented June 24, 1952

2,601,273

UNITED STATES PATENT OFFICE 2,601,273

COPOLYMERS OF CYCLOPENTADIENE

Howard L. Gerhart, Milwaukee, Wis., assignor to Pittsburgh Plate Glass Company, Allegheny County, Pa., a corporation of Pennsylvania No Drawing. Application June 8, 1950,
Serial No. 166,983

30 Claims. (Cl. 260—23.5)

This invention relates to copolymers of cyclopentadiene. According to the present invention valuable copolymers have been obtained by copolymerizing or interacting cyclopentadiene (or dicyclopentadiene) with an unsaturated drying oil and a liquid monomeric ethylenically unsaturated polymerizable compound which contains one or more polymerizable $CH_2=C=$ groups which are linked directly to a negative group but which are free from conjugated aliphatic (including cyclo-aliphatic) diolefin groups.

Valuable copolymers which are useful as drying oils, coating compositions and also in the field of synthetic resins are thus obtained. These copolymers are particularly valuable because they produce films or coatings upon baking which are quite flexible. Many of such copolymers are characterized by their good color and/or rapid drying characteristics. Films of such copolymers upon baking are frequently baked within a shorter time, and are lighter in color and/or more flexible than film of corresponding copolymers wherein the olefin component is omitted.

Furthermore the use of the olefin component specified increases the rate of copolymerization or interaction so that a shorter time and a lower temperature and pressure are required to produce the copolymer than when the olefin is absent. In all probability the improved color is due at least in part to this increase in rate of reaction.

In the ensuing disclosure, percentages and parts are by weight except when expressly stated otherwise.

The contemplated composition is a copolymer of the following:

|  | Per cent |
|---|---|
| Unsaturated glyceride or like oil | 20 to 95 |
| Cyclopentadiene or like lower polymer | 5 to 80 |
| Ethylenically unsaturated compound | 1 to 50 |

The amount of ethylenically unsaturated compound should be at least 5 or 10 percent of the amount of cyclopentadiene used; the preferred range being about 5 to 50 percent of the weight of cyclopentadiene and ethylenically unsaturated compound taken together although desirable products can be obtained using greater amounts of the ethylenic compound up to two or three parts by weight per part of cyclopentadiene. When styrene compounds which contain at least two vinyl groups are used, best results are obtained when the mole ratio of cyclopentadiene to ethylenic compound exceeds 2.

The preparation of the copolymers herein contemplated can be conducted with various unsaturated glyceride oils. Products having superior color and drying or baking characteristics are obtained using linseed oil. However the products herein contemplated may be prepared using various drying or semidrying natural glyceride oils or unsaturated glyceride oils not normally considered drying or semidrying oils, such as Chinawood oil, soybean oil, dehydrated castor oil, sunflower seed oil, cottonseed oil, safflower seed oil, perilla oil and others containing substantial quantities of synthetic or natural unsaturated glycerides of drying oil acids or the corresponding esters of sorbitol, pentaerythritol, or other like polyhydric alcohol polyesters of drying oil acids. Mixtures of such oils also may be used.

These oils may be bodied or unbodied. They may also comprise fractions of natural or synthetic oils of the type set forth above such as those obtained by fractionation with furfural or other selective solvent as taught by Freeman Patents 2,200,390 or 2,200,391 or by other process to fractionate an oil into less saturated and more saturated components.

The contemplated copolymers may be prepared from cyclopentadiene or from lower polymers thereof which crack to cyclopentadiene or at least form the cyclopentadiene copolymer under the reaction conditions. Such lower copolymers include dicyclopentadiene, tricyclopentadiene and like lower homopolymers.

As shown above, the cyclopentadiene or its homopolymer may be employed in various proportions. Where the percentage is low, a liquid coating composition of improved drying characteristics is produced. Such composition may be used without further modification or which may be cooked or otherwise incorporated with various gums or resins such as ester gum or the like. Compositions of this type will include approximately 5% up to 30 or 40% of cyclopentadiene or its equivalent. The invention also contemplates the formation of viscous or resinous copolymers which require further dilution, for example with naphtha or with additional glyceride oils such as drying oils in order to impart sufficient fluidity thereto for coating purposes. These materials will usually comprise a high percentage of cyclopentadiene. The portion of cyclopentadiene or its equivalent may be increased, for example, up to 70 or 80% of the oil-cyclopentadiene mixture in order to provide compositions which are solid and which are adapted for use as gums for cooking with drying oils such as linseed oil or soybean oil to provide varnishes. The invention therefore contemplates variation of the cyclopentadiene or homopolymer of cyclopentadiene upon the basis of the cyclopentadiene-glyceride oil mixture from 5 to 80% based upon the weight of the three components.

Various polymerizable olefinic monomeric compounds which polymerize to solid polymers upon catalysis and which contain no diolefin groups conjugated with respect to carbon compounds or mixtures of two or more of such compounds may be used. Such compounds contain the non-aromatic polymerizable group $CH_2=C=$ and are linked to a negative activating group which activates the polymerizing character of the ethylenic group such as

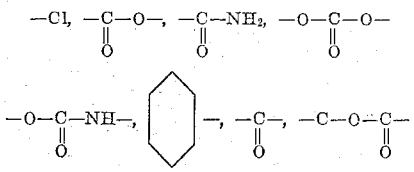

etc. Compounds which contain one or more vinyl groups, $CH_2=C=$, are contemplated. Monofunctional compounds include acrylamide, vinyl chloride, vinylidene chloride, acrylic acid, methacrylic acid, alpha chloro-acrylic acid and esters of such acids, particularly the methyl and ethyl esters such as methyl methacrylate, methyl acrylate, etc., methyl alpha chloracrylate, alpha methylstyrene, alpha methyl para methyl styrene or other chloro, ethyl or methyl substituted styrenes or like aralkene, vinyl acetate, itaconic imide acrylonitrile vinyl methyl ketone, vinyl methyl or butyl ether, allyl acetate, methyl methacrylate, methyl acrylate, allyl carbamate, etc. Polyfunctional compounds which may be used according to this invention include monohydric esters of an unsaturated monohydric alcohol or unsaturated monocarboxylic acid containing a vinyl group in which one carbon atom of the vinyl group is the second carbon atom from an ester linkage including esters of vinyl alcohol, allyl alcohol, methallyl alcohol, 2-chloroallyl alcohol and equivalent alcohols and/or of acrylic and methacrylic and like monocarboxylic acids, each containing up to about 5 carbon atoms. By "ester linkage" is meant the group

having an oxygen atom adjacent to a carboxyl group.

Polyfunctional compound containing two or more of such $CH_2=C=$ groups generally have the advantage of producing increased viscosity of the product at lower operating temperatures and include divinyl benzene, trivinyl benzene, polyesters of the above mentioned unsaturated alcohols and dicarboxylic or polycarboxylic acids including diallyl maleate, diallyl fumarate, diallyl phthalate, diallyl succinate, diallyl adipate, diallyl sebacate, diallyl itaconate, diallyl carbonate, diallyl azelate, diallyl pimelate or the corresponding methallyl, vinyl or like unsaturated alcohol esters or corresponding esters of a polyhydroxy compound and allyl or like acid carbonate such as diethylene glycol bis (allyl carbonate) or like compound disclosed or suggested in U. S. Letters Patent No. 2,385,930. Also contemplated are the esters of the above mentioned unsaturated monohydric alcohols with the above mentioned monocarboxylic acids such as allyl acrylate, allyl methacrylate or vinyl acrylate or the polyhydric alcohol polyesters of such acids, such as ethylene glycol dimethacrylate, ethylene glycol diacrylate, etc. Moreover copolymers of the corresponding ethers of the above unsaturated alcohols such as dimethallyl ether, diallyl ether, divinyl ether may be prepared.

The amount of such vinyl compound may be varied over the range already stated. Best results are obtained with unsaturated esters such as vinyl or allyl esters or divinyl benzene which contain more than one polymerizable vinyl group.

In conducting the reaction, the mixture including the three components, glyceride oil, cyclopentadiene or lower polymer and di- or polyolefinically unsaturated monomer, may be heated in a closed container such as an autoclave or in a continuous coil of pipe of appropriate length. Preferably the reaction is conducted under pressure, for example the pressure generated by the various reactants in the system at the temperature of reaction. Additional mechanical pressure applied to the system by pumps or other means may also be employed, since pressures would seem to favor the reaction but are not strictly necessary. The reaction will proceed satisfactorily at any reasonable pressure so long as an adequate temperature is arrived at in the reaction system. It is also permissible to heat the glyceride oil as a batch to reaction temperature and then add the other two components namely the cyclopentadiene and the olefinically unsaturated monomer continuously as it reacts. If the monomer is sufficiently non-volatile, the monomer and the oil may be heated together and the cyclopentadiene or homopolymer thereof added in small amounts.

Where the cyclopentadiene and/or the olefinically unsaturated monomer are added to the heated oil, it is obvious that the use of a pressure container for the reactants is not strictly necessary since by proper control of the rate of addition of the various components to the heated oil, the pressure may be kept down, even to atmospheric. If such system of operation is employed, a reflux condenser may be desirable to return any vaporized components to the reaction zone.

The temperature of reaction is susceptible of substantial variation. It may be and preferably is substantially lower than that employed in connection with the preparation of a two component copolymer of glyceride oil and cyclopentadiene. A temperature range of about 300 to 600° F. is contemplated in the practice of the invention. However, the optimum temperature for most purposes would seem to be about 450 to 550° F. Preferably the reaction is initiated at a higher temperature, e. g. 500 or 550° F. and then, after the reaction has proceeded for a short time, the mixture is allowed to cool down somewhat, e. g. to 425 to 475° F.

The reaction of a three component system such as herein described proceeds substantially more rapidly at a given temperature than does the corresponding reaction with a two component system of glyceride oil and dicyclopentadiene or its monomer. For this reason the time of heating may often be substantially shortened. The conclusion of the period of heating can be readily determined by conducting viscosity tests upon samples of the product from time to time as will be understood by those skilled in the art. In fact, this is the most common method of procedure, samples being drawn off from time to time and then being subjected to tests such as the Gardner-Holdt test to determine viscosity. A desired viscosity will depend upon numerous factors such as the kinds and amounts of diluents which are to be incorporated with the finished production, the amount of pigmentation which is contemplated in the finished product, the mode of application of the finished product and individual preferences of the users. In most instances the products will be heated until copolymerization has proceeded to such stage as to obtain a product of a body of about A or higher as determined by the Gardner-Holdt scale. The test being conducted upon a sample diluted with 50% of petroleum naphtha of about heptane grade. The copolymerization may be continued on up to practically any stage, even to solidification of the copolymerizable mixture at normal or atmospheric temperatures, since it may be desired to provide a gum or resin which can be cooked with other oils or dissolved in solvents. In general the reaction will be adequately completed within a period of about 2 to 10 hours.

According to a further embodiment the products contemplated may be produced by heating the ethylenic compound with cyclopentadiene or lower polymer to produce a liquid or solid copolymer and heating the copolymer or adduct with a drying oil. This latter heating may be for but a short time because of the advanced stage of reaction achieved by preliminarily reacting the ethylenic compound with the cyclopentadiene.

The resultant products obtained, as previously stated may be liquids or solids and they are soluble in petroleum naphtha and in oils such as linseed oil or soybean oil. They are relatively highly unsaturated, even more unsaturated than the original oil treated and possess excellent air drying properties. That is, films of the material or films containing the materials, will air dry at room temperature or they may be rapidly baked to hard insoluble infusible state. By themselves, or appropriately diluted with naphtha or additional glyceride oils, they may be combined with the conventional paint or varnish driers such as the organic salts of cobalt, lead, nickel, manganese or the like. The naphthenates of the foregoing compounds or the oleates or linoleates constitute examples of such drier compounds. These may be incorporated in practically any desired amount dependent upon the speed of drying preferred in the finished coating composition. One-tenth to 5% based upon the active drying components of the particular composition may be employed. The copolymers will coat and adhere to iron, wood, stone or other materials to provide films.

Pigments such as lead oxide, basic lead carbonate, titanium dioxide, zinc sulphide, barium sulphate, lithopone, calcium carbonate and many others may be incorporated with the compositions in proportions to give hiding power may be included. The pigments may for example be within a range of 5 to 60% of the finished coating composition.

EXAMPLE I

A charge of 492 parts by weight of linseed oil, 40 parts by weight of a solution of divinyl benzene and 268 parts by weight of dicyclopentadiene was heated in an autoclave to 530° F. and the temperature held for 2.25 hours. The charge was dropped from the kettle and the product thinned to 50% solids with mineral spirits. The varnish dried in a normal period and was of exceptionally light color. Driers such as cobalt naphthenate in amounts of 0.1 to 5% may be added.

The divinyl benzene solution used contained 40 percent by weight of divinyl benzene, the balance largely being ethyl styrene. This solution also was used in the ensuing examples, the proportions set forth therein being with reference to the solution.

The advantages are shorter cooking time and light colored product.

EXAMPLE II

In a commercial run, 2,484 lbs. of warm linseed oil, 1,177 lbs. of dicyclopentadiene, and 377 lbs. of divinyl benzene were charged to an autoclave and heated to 505° F. in two hours. The pressure was 60 lbs. at this point and thereafter decreased. After three hours, a sample of the batch had a body of A minus (Gardner-Holdt scale) in a 50% naphtha solution. The batch was cooled at this point to 440° F. which was held. After one hour, including the cooling period, a sample had a body of C plus at 50% solids. The batch was dropped and thinned to 60% total solids. The product had a color of 9 on the Gardner scale, a body of S at 60.6% solids and an acid number under 1.0.

EXAMPLE III

The following compositions were prepared by similar procedures:

| Oil component, Kind | Amt. Pts. by weight | Dicyclopentadiene, Parts by weight | Third Constituent | | Polymerizing Schedule | | Description of Product | |
|---|---|---|---|---|---|---|---|---|
| | | | Kind | Amt. Pts. by weight | Temp. | Time | Body | Color |
| | | | | | | hrs. | | |
| linseed | 492 | 268 | divinyl benzene. | 40 | 530 | 4 | G | 9 |
| Do | 492 | 233 | -----do-------- | 75 | 510 | 7 | G | 7 |
| Do | 492 | 308 | | | 530 | 6.5 | G | 14 |
| Do | 520 | 205 | divinyl benzene. | 75 | 505 | 6.0 | G | 6 |
| soya | 492 | 268 | -----do-------- | 40 | 525 | 8.5 | G | 11 |

Color—Gardner as measured by the Hellige comparator.

EXAMPLE IV

The following examples illustrate the use of diallyl derivatives.

| Oil component, Kind | Amt. Pts. by weight | Dicyclopentadiene, Pts. by weight | Third Constituent | | Polymerizing Schedule | | Body at 50% Solids |
|---|---|---|---|---|---|---|---|
| | | | Kind | Amt. Pts. by wt. | Time | Temp. | |
| | | | | | hrs. | °F. | |
| bodied linseed | 320 | 320 | dimethallyl ether | 160 | 8 | 550 | E |
| Do | 400 | 200 | diallyl ether | 200 | 5 | 550 | H |
| Do | 400 | 100 | ___do___ | 300 | 7.5 | 540 | Under A |
| Do | 480 | 200 | ___do___ | 120 | 5.3 | 550 | |
| Do | 480 | 295 | diallyl fumarate | 25 | 3.7 | 550 | H |
| Do | 430 | 270 | diethylene glycol bis (allyl carbonate). | 100 | 3.1 | 550 | Under A |
| linseed | 246 | 308 | ___do___ | 246 | 2.5 | 527 | J |
| Do | 492 | 228 | ___do___ | 80 | 3.0 | 527 | D |
| Do | 400 | 240 | ___do___ | 160 | 3.0 | 527 | F |
| Do | 492 | 268 | ___do___ | 40 | 2.5 | 527 | F |
| Do | 492 | 300 | ___do___ | 8 | 2.5 | 527 | M |
| Do | 447 | 280 | diallyl ether | 73 | 4 | 535 | E |
| Do | 378 | 237 | ___do___ | 185 | 8 | 535 | G |

It will be apparent that soybean oil could be substituted for linseed oil in each instance where linseed oil is indicated in the Examples I, II, III and IV. Dicyclopentadiene could be replaced by the monomer, trimer or tetramer of cyclopentadiene.

Any of the olefinically unsaturated monomers hereunder listed in Table A including those numbered 1, 2, 5, 8, 9, 10, 11, 13, 14 and 15 may be substituted for compounds 3, 4, 6, 7 and 12 in the various instances of Examples I to IV. Any two or more of compounds 1 to 16 may be employed in appropriate mixture, e. g. 50% mixture. Some adjustment as to time and/or temperature of reaction may be required, but this factor can easily be determined by viscosity tests upon the reaction mixture, taken from time to time as the reaction progresses.

Table A

1—Divinyl ether
2—Diallyl phthalate
3—Diallyl ether
4—Dimethallyl ether
5—Diallyl maleate
6—Diallyl fumarate
7—Ethylene glycol bis-(allyl carbonate)
8—Ethylene glycol dimethacrylate
9—Allyl acrylate
10—Allyl sorbate
11—Vinyl sorbate
12—Divinyl benzene
13—Diallyl succinate
14—Diallyl adipate
15—Diallyl sebacate

EXAMPLE V

Polystyrene is insoluble in linseed oil. Even when the polystyrene is prepared in the presence of the oil, by heating a solution of linseed oil and monomeric styrene, the two ingredients are mutually incompatible and a heterogeneous silky emulsion results which can in no wise be used as film-forming material. When, however, a mixture of:

2 parts linseed oil
1 part styrene
1 part dicyclopentadiene is heated at 260–270° C. in a pressure apparatus, such as an autoclave, for 6 hours, a perfectly homogeneous liquid copolymer is formed which can be dissolved in hydrogenated naphtha and is commercially useful as a film-forming composition.

EXAMPLE VI

A charge of:
1 part cyclopentadiene
1 part p-methyl styrene
3 parts linseed oil
Trace nickel naphthenate was heated in an autoclave, under reaction pressure, for 6 hours at 270° C. The copolymer dries like a China-wood oil varnish, and has very good water resistance.

EXAMPLE VII

A charge of:

3 parts linseed oil
1 part cyclopentadiene
1 part p-methyl-alpha-methyl-styrene was heated in an autoclave at 270° C. to produce a copolymer having a body of E+ in 50 percent, in naphtha.

EXAMPLE VIII

A mixture of 480 parts by weight of linseed oil, 160 parts by weight of styrene, and 160 parts by weight of dicyclopentadiene was placed in an autoclave and the mixture was heated to 290° C. for a period of 12 hours. The pressure of reaction mounted with the increase of temperature, until a maximum was reached. It then gradually subsided. The reaction product was taken from the autoclave at the end of this time (after it had been appropriately cooled) and was thinned with an equal weight of petroleum naphtha, to provide a vehicle of G body on the Gardner-Holdt scale. The color, according to the Gardner scale, was 11. This vehicle, either with or without incorporations of additional drying oils, and with or without driers such as cobalt naphthenate or cobalt linoleate, could be applied by brushing or spraying to wood or metal, and air dried or baked to provide hard and durable finishes.

EXAMPLE IX

In this example, a mixture of 600 parts of linseed oil, 160 parts of styrene, and 40 parts of dicyclopentadiene (parts are by weight) was placed in a pressure container, such as an autoclave, which was heated to 280° C. for five hours. The reaction product, after removal from the autoclave, was a modified bodied oil of a viscosity of Z (Gardner-Holdt) and a color of 8, according to the Gardner scale. It was of 99.4% solids content. The product was a good coating composition, and could be added to drying oils and to petroleum naphtha to provide a drying coating material.

EXAMPLE X

In this example, a mixture of 160 parts of linseed oil, 600 parts of styrene and 40 parts of dicyclopentadiene, was placed in an autoclave which was heated to 290° C. for five hours. The reaction product, upon removal from the autoclave, was thinned with an equal weight of xylene to give vehicle of "A" body and a color of 11. This product could also be incorporated with additional linseed or soya oil or with pigments, in accordance with conventional technique in the preparation of coating compositions.

Additional examples of the application of the invention, using a pressure apparatus and reacting all components simultaneously, are tabulated as follows:

| Oil | Percent Oil | Cyclopentadiene Per Cent | Third Component | Percent | Cooking Conditions | |
|---|---|---|---|---|---|---|
| | | | | | Temp. ° F. | Time at this temp. |
| | | | | | | Hours |
| Linseed | 58.6 | 36.6 | Styrene | 4.8 | 505–525 | 3.5 |
| Soya | 55.8 | 35.0 | do | 9.2 | 515–535 | 5.5 |
| Linseed | 55.8 | 35.0 | do | 9.2 | 515–535 | 4.5 |
| Do | 47.5 | 29.5 | do | 23.0 | 525–535 | 5.0 |
| Soya | 47.5 | 29.5 | do | 23.0 | 525–545 | 10.8 |
| Linseed | 41.0 | 25.6 | do | 33.4 | 525–535 | 7.0 |
| Do | 55.8 | 35.0 | Alpha Me Styrene | 9.2 | 515–530 | 4.0 |
| Do | 55.8 | 35.0 | Alpha Me p-Me Styrene | 9.2 | 525–535 | 3.5 |
| Do | 60.0 | 37.5 | do | 2.5 | 510–525 | 3.5 |
| Do | 47.5 | 29.5 | Alpha Me Styrene | 23.0 | 535 | 6.0 |

Body: These batches were cooked to G viscosity at 50% total solids, in naphtha.

These products can all be dissolved in petroleum naphtha and drying oils, such as linseed oil, to form coating material. They can also be admixed, when in liquid state, with pigments such as titanium dioxide, and driers such as oil soluble salts of heavy metals, e. g. cobalt oleate or linoleates in an amount of .001 to 1%, to promote air drying. Divinyl benzene could be substituted, at least in part, for the third component in any of the mixtures above tabulated.

In similar manner, a mixture of glyceride oil (preferably drying), cyclopentadiene or dicyclopentadiene, and styrene and/or alpha methyl styrene can be copolymerized at atmospheric pressures under a reflux condenser. In this type of reaction, a catalyst preferably of the organic peroxide type, e. g. benzoyl peroxide, is preferred, though it is not required in all instances.

The following examples illustrate the preparation of three-component copolymers from the mixture of three components, and under atmospheric pressure:

EXAMPLE XI

According to this example, a product of heavy body was prepared by the inclusion of a small amount of divinyl benzene in the reaction mixture. The charge comprised 86.6 parts refined soya oil, 21.7 parts tung oil to which was added 66.5 parts styrene, 22.2 parts dicyclopentadiene, 1 part of a 40% divinyl benzene, 2 parts cumene hydroperoxide. It was heated at atmospheric pressure, under a reflux condenser which was vented to the atmosphere, to a temperature of 160° C. in a period of about 30 minutes. Here the mixture was maintained for a period of 32 hours, or until 280° C. was reached. A product of a body of Q was formed, at 66% of solids.

EXAMPLE XII

In accordance with the technique of this example, 50 parts by weight of linseed oil, 35 parts of styrene, and 15 parts of dicyclopentadiene were heated to 80° C. in a three-necked flask fitted with a stirrer, reflux condenser vented to the atmosphere, and thermometer. When the foregoing temperature was reached, 1 part of benzoyl peroxide was added to the reaction mixture, and the temperature was raised to 160° C. over a period of one hour. Here it remained for two hours. The temperature was then raised to 200° C. in a period of 3½ hours, where it was held for 60 hours while the product gradually gained in body. The product was light yellow in color, and of resinous character. It comprised 98.3% solids, had a color rating of 7, and an iodine number of 107.

EXAMPLE XIII

A considerable number of examples of products obtained by reacting unsaturated glyceride oils, styrene, and cyclopentadiene, under reflux at atmospheric pressures, are presented in the following example in tabular form:

*Atmospheric reaction examples*

| Oil Used | Oil to Olefin-Diolefin Ratio | Olefin to Diolefin Ratio | Temp. ° C. | Yield Per-cent | Acid No. | Body (G–H) |
|---|---|---|---|---|---|---|
| Linseed | 2:1 | 2:1 | 250 | 95.7 | 1.1 | Z–5 |
| Do | 2:1 | 2:1 | 280 | | 5.1 | V. H.[1] |
| Do | 2:1 | 3:1 | 250 | 96.6 | 0.4 | Z |
| Do | 2:1 | 3:1 | 280 | 93.4 | 5.7 | V. H. |
| Do | 2:1 | 1:1 | 250 | 92.9 | 5.7 | Z–3½ |
| Do | 1:1 | 2:1 | 250 | 90.4 | 0.9 | V. H. |
| Do | 1:1 | 1:1 | 250 | 86.7 | 0.3 | V. H. |
| Soya | 2:1 | 1:1 | 250 | 91.7 | 5.8 | W |
| Linseed | None | None | 302 | 97 | 12–14 | Z–2½ |

[1] V. H. — Very heavy — beyond Z–6 G. H.

The styrene and cyclopentadiene were mixed and added to the agitated oil slowly, at the temperature shown and at atmospheric pressure conditions, so that but little cyclopentadiene escaped. About an hour after the addition was completed, the run was stopped and unreacted materials blown out. The operating times varied from about 5 to 16 hours.

The products obtained in Examples XI, XII and XIII are useful coating materials which may be combined with drying oils such as linseed oil, or with naphtha or other diluents, driers such as cobalt, oleate or naphthenate and the like. They can be applied to wood or metal by spraying or brushing or other techniques. They can be sufficiently air-dried or baked to form valuable finishes.

As previously indicated, the invention also contemplates the addition of styrene and/or alpha methyl styrene to a two-component primary resin obtained by copolymerization of an unsaturated glyceride oil and cyclopentadiene or dicyclopentadiene. The reaction may be effected in a closed pressure container such as an autoclave, or under a reflux condenser at atmospheric pressure. A catalyst may be included, but is not always required. The reaction of the primary two-component resin and styrene, under pressure and in the presence of a catalyst, will first be considered.

EXAMPLE XIV

A mixture of 640 parts of 20 gallon oil length linseed oil-cyclopentadiene resin (20 gallons of oil per 100 lbs. of cyclopentadiene), 112 parts styrene, 48 parts alpha methyl styrene and 8 parts of benzoyl peroxide was placed in an autoclave which was heated to 160° C. for two hours. The pressure was that of reaction. The mixture was then heated to 235° C. for five hours, at which time the resin reached a G viscosity at 50% solids in naphtha. The reaction product was taken from the autoclave and thinned with an equal weight of petroleum naphtha. The resultant vehicle could be applied to wood or metal to provide films of good gloss and durability.

EXAMPLE XV

According to this example, a mixture of 80 parts of linseed oil and 5 parts of dicyclopentadiene was placed in an autoclave which was heated to 280° C. for one hour to provide a two-component primary body. The temperature was then dropped to 125° C. and a mixture of 15 parts of styrene and one part of an organic peroxide catalyst, such as benzoyl peroxide, was added. The autoclave was heated to 160° C. and held for 1 hour, the pressure being allowed to rise at will. It was subsequently heated to 280° C. in a period of 2½ hours, and maintained at the latter temperature for 3½ hours. The resultant reaction product had a viscosity of $Z_3$ in the Gardner-Holdt scale, color of 11, and a solids content of 99.4%. It could be sprayed on wood and metal with or without appropriate driers, pigments, and the like.

EXAMPLE XVI

In this example, 5 parts of dicyclopentadiene and 80 parts of linseed oil were preliminarily copolymerized by addition, in an autoclave, in accordance with conventional technique, e. g. that disclosed in Example XV. Then 15 parts of styrene were added and the reaction mixture brought to a temperature of 285° C. or thereabout, until the reaction was substantially completed as evidenced by a drop in pressure in the autoclave.

EXAMPLE XVII

In this example, 15 parts of dicyclopentadiene and 80 parts of linseed oil, preliminarily reacted by addition to provide a primary copolymer, were incorporated, in the absence of peroxide catalysts, with 5 parts of styrene in an autoclave, and heated to a temperature of about 285° C. until the pressure dropped substantially. The resultant product could be employed as a coating composition, with or without the inclusion of additional linseed oil.

EXAMPLE XVIII

Eight hundred parts of a twenty gallon oil length linseed-cyclopentadiene resin, which had an "A" viscosity at 50% solids in naphtha, was heated to 160° C. in a three-neck flask, which was equipped with an agitator, dropping funnel, thermometer, and condenser. To the base resin was added dropwise, over a period of three hours, a mixture consisting of 140 parts styrene, 60 parts alpha methyl styrene, and ten parts benzoyl peroxide. After the addition, the resin was heated to bodying temperature, 230° C., in approximately three to four hours, at such a rate that there was only a moderate reflux. The reflux was strongest at 205-225° C. The resin obtained the desired viscosity "G" at 50% solids in naphtha, in five hours. The resin was thinned to 60% solids with naphtha.

It is also permissible, under some circumstances, to preliminarily react the cyclopentadiene and the styrene and/or alpha methyl styrene to provide a gum-like copolymer that can then be cooked with an unsaturated glyceride oil, such as linseed or soybean oil. The final reaction may be under pressure in an autoclave, or at atmospheric pressures.

EXAMPLE XIX

According to this example, 1 part of styrene and 2.3 parts of dicyclopentadiene were copolymerized at 250° C. for three hours. The resultant hard gum could be cooked with vegetable oils, such as linseed oil or soybean oil, in substantially any proportion. Of course, as the proportion of oil increased, the product more and more resembled the modified oil and, conversely, as the proportion of oil decreased, the product assumed more and more the characteristics of the hard gum. It is contemplated that the gum may constitute 5 to 50% of the three-component product obtained by cooking the gum and the oil together. The cooking may be conducted at a temperature of about 250 to 300° C. The cooking operation need be conducted only until the gum goes into solution, but longer periods of time, e. g. 3 to 4 hours of additional cooking, are also contemplated.

EXAMPLE XX

The polymer of vinylacetate is insoluble in glyceride oils. However, when 1 part vinyl acetate
3.55 parts dicyclopentadiene
7 parts linseed oil
Trace nickel naphthenate are heated for 10 hours at 260-270° C. the resulting three component copolymer is useful as an air-drying or baking finish.

EXAMPLE XXI 1 part 95% indene
2.2 parts dicyclopentadiene
4.8 parts linseed oil were heated 7 hours at 260-270° C. The product is amber colored and dries rapidly to give a film having good water resistance.

EXAMPLE XXII

The styrenated oil used to prepare the cyclopentadiene-drying glyceride oil resins was prepared as follows:

79.2 parts of refined linseed oil and 8.8 parts of tung oil were heated to 160° C. in the usual manner, and then a mixture of 25.2 parts of styrene, 10.8 parts of alpha-methyl styrene, and 1.6 parts of benzoyl peroxide were added dropwise, in a period of three hours. The temperature of this reaction mixture was raised to 285° C. in a period of 6½ hours.

After cooling, 56.0 parts of this oil were charged into an autoclave, together with 24.0 parts of dicyclopentadiene. This mixture was brought to a temperature of 285° C. in a period of 3½ hours, where it was held for 2½ hours. At this point the product had a body of "U" at 60% solids, and a color rating of about 14. When mixed with the usual quantity of drier, a film formed from the product was hard and tough, but not brittle. In general, it is an excellent film of good durability.

It is further contemplated preliminary to react, at atmospheric pressure, a glyceride drying oil, soybean oil, or linseed oil with styrene or a mixture of alpha methyl styrene, and then further to copolymerize this product with dicyclopentadiene. The following constitutes an example of such technique:

EXAMPLE XXIII

According to this example, a charge consisting of 83.6 parts of refined soya oil and 4.4 parts of tung oil, which mixture had been preliminarily styrenated with 50.4 parts of styrene, was reacted with 21.6 parts of dicyclopentadiene in the presence of 2.16 parts of benzoyl peroxide. The reaction was conducted at atmospheric pressure, under a reflux condenser vented to the atmosphere, and was continued until refluxing ceased at a temperature of about 285° C. A semi-solid mass of 88 iodine value and 97.1% of total solids, was obtained. This product, when dissolved in xylol to provide a body of 75% solids in a mixture of naphtha and xylol, had a body of "U". The resultant products were hard and tough when dried as films, and were generally of good texture and good resistance to the reaction of water and alkali.

EXAMPLE XXIV

Another example of the atmospheric resinification of the styrenated oil is as follows:

79.2 parts of refined linseed oil and 8.8 parts of China-wood oil were styrenated in the usual manner, by a mixture of 25.2 parts of styrene, 10.8 parts of alpha methyl styrene, and 2.16 parts of benzoyl peroxide, at a temperature of 160° C. during a period of 3 hours.

The temperature of the reaction mixture was then raised to 250° C. and, after dropping back to 200° C., 36.0 parts of dicyclopentadiene were added, at atmospheric pressure, in a period of 3 hours. The reaction temperature then was raised to 275° C. in a period of 3 hours, where it was held for an additional 3 hours. After this, it was thinned to a body of I, and a color of 11+, by addition of 25.8 parts of xylol and 77.2 parts of naphtha.

EXAMPLE XXV

In this example equal parts of diallyl maleate and dicyclopentadiene were combined with linseed oil. The linseed oil was varied in proportion from 1 to 3 parts. The mixture was heated in an autoclave to a temperature of about 260 to 270° C. until the reaction was completed. In this example diallyl maleate may be replaced in part or completely by other diallyl esters such as the diallyl ester of succinic acid, chlorosuccinic acid, fumaric acid, malonic acid, maleic acid, citric acid, citriconic acid, tartaric acid and others. Dicyclopentadiene may be partially or completely replaced by its monomer or by tricyclopentadiene for copolymerization with the oil and the above described esters. Linseed oil may be replaced by soybean oil or diluted castor oil. Likewise, at least a part of the linseed oil or soybean oil may be replaced by tung oil. The resultant products were cooled in the reaction chamber somewhat and could then be diluted with naphtha to provide coating compositions.

EXAMPLE XXVI

In this example equal parts of diallyl phthalate and cyclopentadiene or dicyclopentadiene and 1 to 3 parts of glyceride oil such as linseed oil, castor oil or soybean oil were introduced into an autoclave and heated to reaction temperature until copolymerization was complete. These products could be made up with thinners or additional oil to provide good coating compositions.

The compositions as herein disclosed as liquid, can be employed as such, or if solids, may be incorporated with additional oils by conventional cooking operations. They may be combined with pigmentary bodies or fillers such as titanium dioxide, basic lead carbonate, lithopone, calcium carbonate and many other non-reactive pigmentary materials in order to obtain opacity or desired color. The pigmentary material may be in a range of 5 to 60% or even more as may be desired in a specific paint or varnish formulation.

The compositions may include driers such as the salts of heavy metals such as iron, nickel, manganese, chromium, etc. These are the conventional driers of the paint and varnish industry. They include almost any of the oil soluble compounds of the metals. Oleates, linoleates and naphthenates of cobalt, manganese and the like are the most commonly employed compounds.

It is also possible to prepare improved products by first reacting cyclopentadiene or dicyclopentadiene with a compound containing a reactive ethylenic group and then subsequently to react the product with a glyceride oil, such as linseed oil. The following examples will illustrate this method of procedure:

EXAMPLE XXVII 1 part acrylonitrile and 2.3 parts dicyclopentadiene were heated for 6 hours at 250 to 270° C. The product is a hard gum insoluble in naphtha, practically soluble in xylene, soluble in acetone and cyclohexanone. It reacts with linseed oil when heated to 270° C. to provide a soluble product. If enough oil is added, the product is liquid and can be applied as a coating medium.

EXAMPLE XXVIII 1 part vinyl acetate and 2.3 parts cyclopentadiene were heated in an autoclave at a temperature schedule which gradually increased from 180 to 270° C. during 6 hours. A very light colored soft resin with a sweet odor was formed. It is soluble in hydrocarbons. The resin was distilled at reduced pressure. The first fraction was removed at 95° to 160° C. at 15 mm. pressure, the second fraction at 160–175° C. The residue is a hard gum which is very soluble in vegetable oils and has remarkable drying properties.

EXAMPLE XXIX 1 part of dimethallyl ether, 1 part of cyclopentadiene and 1 to 3 parts of a glyceride oil, such as linseed or castor oil were heated together to provide a copolymer.

EXAMPLE XXX

Equal parts of diamylene and cyclopentadiene were heated with 1 to 3 parts of a glyceride oil, such as soy-bean oil, to provide a coating composition.

It will be understood that other components may be added to the copolymerizable mixture. For example indene, cumarone, fumaric esters, maleic esters, etc., may be added in addition to the three components of the above examples. The amount of such other component should not be so large as to materially influence the character of the product and usually does not exceed 10 percent of the total polymerizable components.

Although the present invention has been described with respect to the specific details of certain embodiments thereof, it is not intended that such limitations shall be regarded as limitations upon the scope of the invention except insofar as included in the accompanying claims.

This application is a continuation in part of my applications Serial No. 470,093, now abandoned, filed December 24, 1942, Serial No. 621,972, filed October 12, 1945, now U. S. Patent 2,443,044, Serial No. 21,763, filed April 17, 1948, Serial No. 54,216, filed October 12, 1948, and Serial No. 89,789, filed April 26, 1949, now abandoned.

What is claimed:

1. A copolymer of 20 to 90 percent by weight of an unsaturated glyceride oil, 5 to 80 percent by weight of a member of the group consisting of cyclopentadiene and lower homopolymers of cyclopentadiene and 1 to 50 percent by weight of a monomeric polymerizable ethylenically unsaturated compound which contains a $$CH_2=C-$$

group linked to a negative group but which is free from conjugated diolefin groups.

2. The copolymer of claim 1 wherein the unsaturated ethylenic compound is an ester of an unsaturated aliphatic monohydric alcohol containing up to 5 carbon atoms of a carboxylic acid.

3. The copolymer of claim 1 wherein the unsaturated compound is an allyl ester of a carboxylic acid.

4. The copolymer of claim 1 wherein the unsaturated compound is a vinyl ester of a carboxylic acid.

5. A method of preparing a copolymer which comprises heating together to a temperature of from about 300 to about 600° F. 20 to 90 percent by weight of an unsaturated glyceride oil, 5 to 80 percent by weight of a member of the group consisting of cyclopentadiene and lower homopolymers of cyclopentadiene and 1 to 50 percent by weight of a monomeric polymerizable ethylenically unsaturated compound which contains a $$CH_2=C-$$

group but which is free from conjugated diolefin groups.

6. The process of claim 5 wherein the unsaturated compound is an ester of an aliphatic monohydric unsaturated alcohol containing up to 5 carbon atoms of a carboxylic acid.

7. The process of claim 5 wherein the unsaturated compound is an allyl ester of a carboxylic acid.

8. The process of claim 5 wherein the unsaturated compound is a vinyl ester of a carboxylic acid.

9. The copolymer of claim 1 wherein the unsaturated compound is an ester of an unsaturated alcohol containing up to 5 carbon atoms containing a vinyl group in which one carbon atom of the vinyl group is the second atom from an ester linkage.

10. A copolymer of 20 to 90 percent by weight of an unsaturated glyceride oil, 5 to 80 percent by weight of a member of the group consisting of cyclopentadiene and lower homopolymers of cyclopentadiene and 1 to 50 percent by weight of a monomeric polymerizable polyester of a polycarboxylic acid and an unsaturated aliphatic alcohol containing up to 5 carbon atoms.

11. The method of claim 5 wherein the ethylenic compound is a polyester of a polycarboxylic acid and an unsaturated aliphatic alcohol containing up to 5 carbon atoms.

12. A copolymer of an unsaturated glyceride oil, a monomeric polymerizable ethylenically unsaturated compound which contains a $$CH_2=C-$$

group linked to a negative group and which is free from conjugated diolefin groups, and a member of the group consisting of cyclopentadiene and lower homopolymers of cyclopentadiene.

13. The copolymer of claim 12 wherein the unsaturated ethylenic compound is an ester of a carboxylic acid and an unsaturated aliphatic monohydric alcohol containing up to 5 carbon atoms.

14. The copolymer of claim 12 wherein the unsaturated ethylenic compound is an allyl ester of a carboxylic acid.

15. The copolymer of claim 12 wherein the unsaturated ethylenic compound is a vinyl ester of a carboxylic acid.

16. A copolymer of an unsaturated glyceride oil, an unsaturated aliphatic alcohol diester of an ethylenically unsaturated dicarboxylic acid, and a member of the group consisting of cyclopentadiene and lower homopolymers of cyclopentadiene; said unsaturated alcohol containing up to 5 carbon atoms.

17. The copolymer of claim 12 wherein the ethylenically unsaturated compound is diallyl maleate.

18. The copolymer of claim 12 wherein the ethylenically unsaturated compound is diallyl fumarate.

19. The copolymer of claim 16 wherein the diester is a diallyl ester.

20. The copolymer of claim 12 wherein the ethylenically unsaturated compound is vinyl acetate.

21. A copolymer of an unsaturated glyceride oil, cyclopentadiene, and vinyl acetate.

22. A copolymer of linseed oil, vinyl acetate, and a member of the group consisting of cyclopentadiene and lower homopolymers of cyclopentadiene.

23. The copolymer of claim 1 wherein the ethylenic compound is vinyl acetate.

24. A copolymer of a copolymerizable mixture, said mixture consisting of 1 part of vinyl acetate, 3.55 parts of dicyclopentadiene, and 7 parts of linseed oil.

25. The copolymer of claim 1 wherein the ethylenically unsaturated compound contains two polymerizable unconjugated $$CH_2=C-$$

groups.

26. The copolymer of claim 12 wherein the ethylenically unsaturated compound contains two polymerizable unconjugated

groups.

27. The copolymer of claim 1 wherein the ethylenically unsaturated compound is styrene.

28. The copolymer of claim 1 wherein the ethylenically unsaturated compound is divinyl benzene.

29. The copolymer of claim 12 wherein the ethylenically unsaturated compound is styrene.

30. The copolymer of claim 12 wherein the ethylenically unsaturated compound is divinyl benzene.

HOWARD L. GERHART.

REFERENCES CITED

The following references are of record in the file of this patent:

UNITED STATES PATENTS

| Number | Name | Date |
|---|---|---|
| 2,259,496 | Soday | Oct. 21, 1941 |
| 2,280,862 | Sorenson | Apr. 28, 1942 |
| 2,443,044 | Lycan et al. | June 8, 1948 |
| 2,445,627 | Morris et al. | July 20, 1948 |
| 2,482,736 | Rust | Sept. 20, 1949 |